United States Patent
Oga (10) Patent No.: US 9,849,846 B2
(45) Date of Patent: Dec. 26, 2017

(54) WIRE HARNESS AND METHOD FOR INSERTING ELECTRICAL CONDUCTIVE PATHS THROUGH WIRE HARNESS

(71) Applicant: YAZAKI CORPORATION, Tokyo (JP)

(72) Inventor: Tatsuya Oga, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/159,886

(22) Filed: May 20, 2016

(65) Prior Publication Data
US 2016/0264074 A1 Sep. 15, 2016

Related U.S. Application Data

(63) Continuation of application No. PCT/JP2014/083907, filed on Dec. 22, 2014.

(30) Foreign Application Priority Data

Dec. 24, 2013 (JP) ................................. 2013-264900

(51) Int. Cl.
*H02G 3/04* (2006.01)
*B60R 16/02* (2006.01)
(Continued)

(52) U.S. Cl.
CPC ........... *B60R 16/0215* (2013.01); *H01B 7/04* (2013.01); *H02G 1/00* (2013.01); *H02G 3/0462* (2013.01);
(Continued)

(58) Field of Classification Search
CPC ...... H02G 3/0462; H02G 1/00; H02G 3/0468; H02G 3/0481; H02G 3/0487; B60R 16/0215; H01B 7/04
See application file for complete search history.

(56) References Cited

U.S. PATENT DOCUMENTS 5,003,129 A * 3/1991 Toyomasu .......... B60R 16/0215
174/136
5,360,291 A * 11/1994 Shimizu .................... F16L 1/24
254/134.3 R
(Continued)

FOREIGN PATENT DOCUMENTS

CN 1521058 A 8/2004
CN 103282974 A 9/2013
(Continued)

OTHER PUBLICATIONS

JP1981-50489.*
(Continued)

*Primary Examiner* — Steven T Sawyer
(74) *Attorney, Agent, or Firm* — Sughrue Mion, PLLC (57) ABSTRACT

A wire harness includes electrical wires and an outer covering member. The outer covering member includes tube portions different in cross-sectional shape and size and a guiding shape portion between adjacent tube portions. The guiding shape portion guides the electrical wires when inserted. A cap is provided to each one end of the electrical wires, and the electrical wires are passed through the guiding shape portion with the caps facing frontward. A wire harness and a method for inserting electric conductive paths through the wire harness can enhance workability related to the electrical conductive paths and an outer covering member while suiting the wire harness to the shapes and the usage environments.

6 Claims, 7 Drawing Sheets

(51) Int. Cl.
*H01B 7/04* (2006.01)
*H02G 1/00* (2006.01)
(52) U.S. Cl.
CPC ......... *H02G 3/0468* (2013.01); *H02G 3/0481* (2013.01); *H02G 3/0487* (2013.01)

(56) References Cited

U.S. PATENT DOCUMENTS

| | | | |
|---|---|---|---|
| 6,084,181 A * | 7/2000 | Lilienthal, II | H01B 7/009 174/115 |
| 2005/0011687 A1 | 1/2005 | Yamaguchi et al. | |
| 2013/0248038 A1 | 9/2013 | Aoyama et al. | |

FOREIGN PATENT DOCUMENTS

| JP | 08-265933 A | 10/1996 |
|---|---|---|
| JP | 2004-224156 A | 8/2004 |
| JP | 2007-066825 A | 3/2007 |
| JP | 2012-134367 A | 7/2012 |
| JP | 2012-138179 A | 7/2012 |

OTHER PUBLICATIONS

International Search Report of PCT/JP2014/083907 dated Feb. 3, 2015 [PCT/ISA/210].
Communication dated Apr. 6, 2017 from the State Intellectual Property Office of the P.R.C. in counterpart application No. 201480065154.7.
Communication dated Jun. 6, 2017 from the Japanese Patent Office in counterpart Japanese application No. 2013-264900.
Communication dated Jun. 2, 2017, from the Japanese Patent Office in counterpart Japanese application No. 2013-264900.

* cited by examiner

WIRE HARNESS AND METHOD FOR INSERTING ELECTRICAL CONDUCTIVE PATHS THROUGH WIRE HARNESS

CROSS-REFERENCE TO RELATED APPLICATION

This application is a continuation application of International Application PCT/JP2014/083907, filed on Dec. 22, 2014, and designating the U.S., the entire contents of which are incorporated herein by reference.

BACKGROUND OF THE INVENTION

1. Field of the Invention

The present invention relates to a wire harness including electrical conductive paths and an outer covering member as components. The present invention also relates to a method for inserting electrical conductive paths through a wire harness.

2. Description of the Related Art

Examples of a conventional wire harness include a wire harness that electrically interconnects high-voltage devices installed in a hybrid vehicle or an electrical vehicle.

A wire harness disclosed in Japanese Patent Application Laid-open No. 2004-224156 is composed by including three high-voltage electrical wires and three outer covering members used for separately accommodating and protecting these three high-voltage electrical wires. Each outer covering member is a metal pipe having a circular cross-section. After the high-voltage electrical wire is inserted through the outer covering member, the outer covering member undergoes a bending process so as to be suited to the shapes of places in which the wire harness is routed. The number of times the bending process is performed equals to the number of outer covering members.

A wire harness disclosed in Japanese Patent Application Laid-open No. 2007-66825 is composed by including three high-voltage electrical wires and one outer covering member used for collectively accommodating and protecting these three high-voltage electrical wires. The outer covering member is a metal bellows pipe, and the three high-voltage electrical wires are inserted through this single outer covering member. After the insertion, the outer covering member undergoes a bending process so as to be suited to the shapes of places in which the wire harness is routed.

As the outer covering member, a member being rather large and having a circular cross-section is used so as to allow the three high-voltage electrical wires to be collectively inserted. The outer covering member is formed in the same cross-sectional shape continuously from one end thereof to the other end thereof.

In the case of the wire harness disclosed in Japanese Patent Application Laid-open No. 2004-224156, three high-voltage electrical wires have to be separately housed into the respective outer covering members, and this makes the work very laborious. In consideration of this inconvenience, an outer covering member through which three high-voltage electrical wires can be collectively inserted, such as the one of the wire harness disclosed in Japanese Patent Application Laid-open No. 2007-66825, seems effective. However, such an outer covering member may potentially bring the following inconvenience, for example, when it is necessary to route the wire harness on a vehicle floor underside. That is, the outer covering member has a circular cross-section and is rather large, the distance thereof from the ground surface is not sufficient, and therefore may potentially bring an inconvenience that the outer covering member is damaged or broken by a flying stone or at a time of riding on a curbstone.

Adding variations to the cross-sectional shape or the like of the outer covering member according to the shapes of places in which the wire harness is routed and the usage environments may be considered as a resolution to the foregoing inconvenience. However, this resolution inevitably makes it necessary to prepare and selectively use outer covering members of a plurality of kinds, and brings another inconvenience that processes such as a fixation process thereof to high-voltage electrical wires are additionally involved, undesirably resulting in an inconvenience of reduced workability. Furthermore, it is likely that inserting three high-voltage electrical wires is difficult or jamming of an electrical wire occurs in a location where different cross-sectional shapes meet each other, and the inconvenience of reduced workability is brought also when that occurs.

SUMMARY OF THE INVENTION

The present invention has been made in view of the foregoing situation, and is directed to providing a wire harness and a method for inserting electrical conductive paths through a wire harness that can enhance workability related to the electric conductive paths and an outer covering member while suiting the wire harness to the shapes of places in which the wire harness is routed and the usage environments.

To achieve the above-described objective, a wire harness according to one aspect of the present invention includes a plurality of electrical conductive paths; and an outer covering member configured to have the electrical conductive paths inserted therethrough and protect the electrical conductive paths, wherein the outer covering member includes, along an axial direction thereof, tube portions of a plurality of kinds different from each other in cross-sectional shape and/or size and a guiding shape portion between adjacent tube portions out of the tube portions of the plurality of kinds, the guiding shape portion serving as a portion that guides the electrical conductive paths at a time the electrical conductive paths are inserted, and the guiding shape portion is formed so that a shape thereof gradually changes from one to the other of the adjacent tube portions and configured to guide each of the electrical conductive paths individually.

According to another aspect of the present invention, in the wire harness, it is preferable that the guiding shape portion is formed so as to change an array of the electrical conductive paths from the one to the other of the adjacent tube portions.

According to still another aspect of the present invention, in the wire harness, it is preferable that the guiding shape portion is formed so as to be able to guide the electrical conductive paths regardless of whether a guiding is from the one to the other or from the other to the one of the adjacent tube portions.

To achieve the above-described objective, a method for inserting electrical conductive paths through a wire harness according to still another aspect of the present invention includes providing a cap to each one end of a plurality of electrical conductive paths of a wire harness, the wire harness including an outer covering member configured to have the electrical conductive paths inserted therethrough and protect the electrical conductive paths, the outer covering member including, along an axial direction thereof, tube portions of a plurality of kinds different from each other in cross-sectional shape and/or size and a guiding shape portion between adjacent tube portions out of the tube portions of the plurality of kinds, the guiding shape portion serving as a portion that guides the electrical conductive paths at a time the electrical conductive paths are inserted, and the guiding shape portion is formed so that a shape thereof gradually changes from one to the other of the adjacent tube portions and configured to guide each of the electrical conductive paths individually; and passing the electrical conductive paths through the guiding shape portion with one side thereof that has the caps facing frontward at the time the electrical conductive paths are inserted through the outer covering member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A wire harness is composed by including electrical conductive paths and an outer covering member. The outer covering member includes, along the axial direction thereof, tube portions of a plurality of kinds different from each other in cross-sectional shape and/or size. The outer covering member further includes a guiding shape portion between adjacent tube portions out of the tube portions of the plurality of kinds. A guiding shape portion is provided as a portion that guides the electrical conductive paths at a time the electrical conductive paths are inserted. A guiding shape portion is provided together with the tube portions of the plurality of kinds. When the electrical conductive paths are inserted through the outer covering member, a cap is provided to each one end of the electrical conductive paths, the electrical conductive paths are passed through the guiding shape portion with one side thereof that has the caps facing frontward.

First Embodiment

Figure 1A:
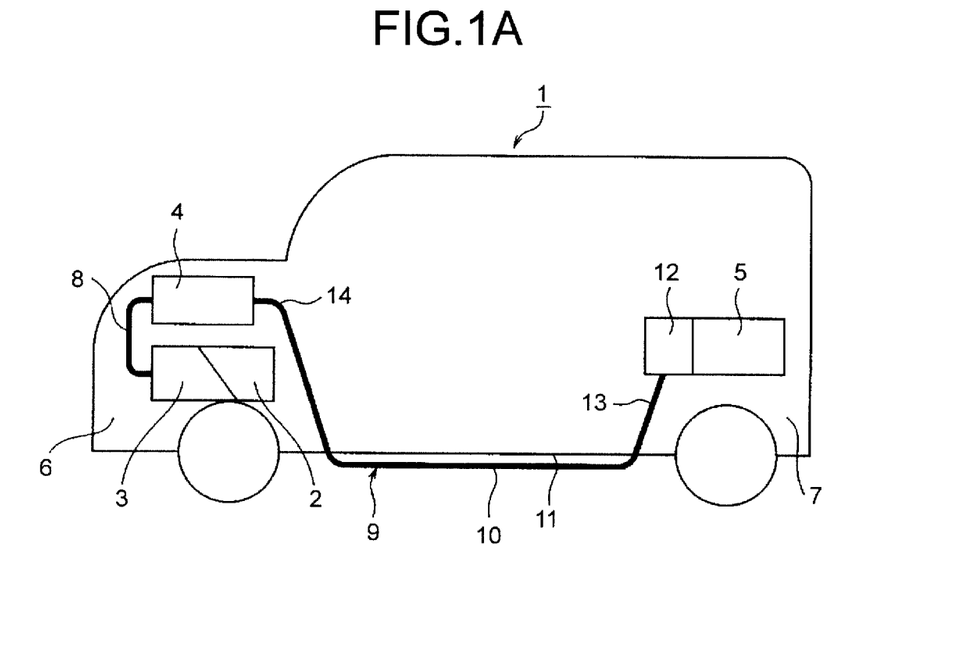
FIG. 1A is a view relating to a wire harness according to the present invention, more specifically, a view illustrating the routed wire harness (First Embodiment)
Figure 1B:
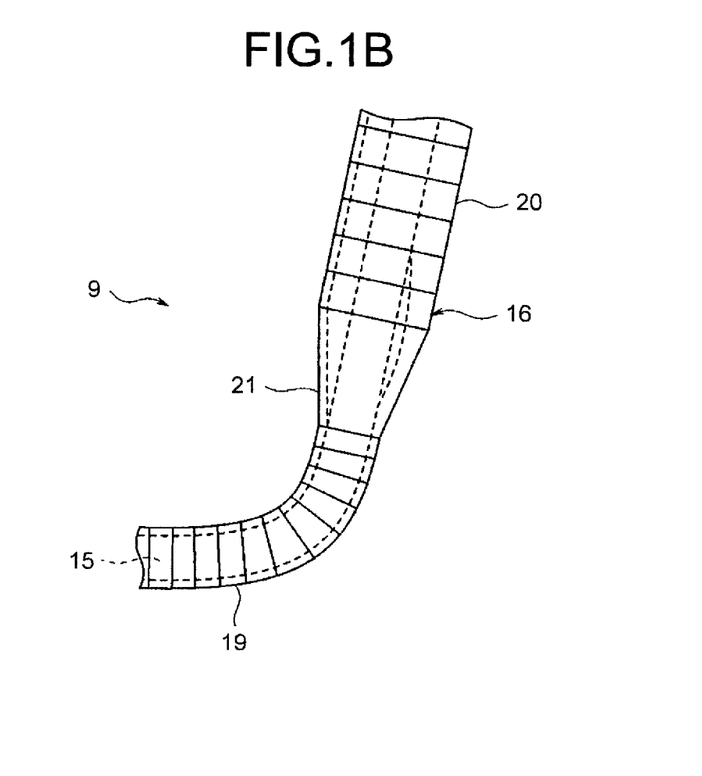
FIG. 1B is a view relating to the wire harness according to the present invention, more specifically, an enlarged view of a main part thereof (First Embodiment)
Figure 2A:
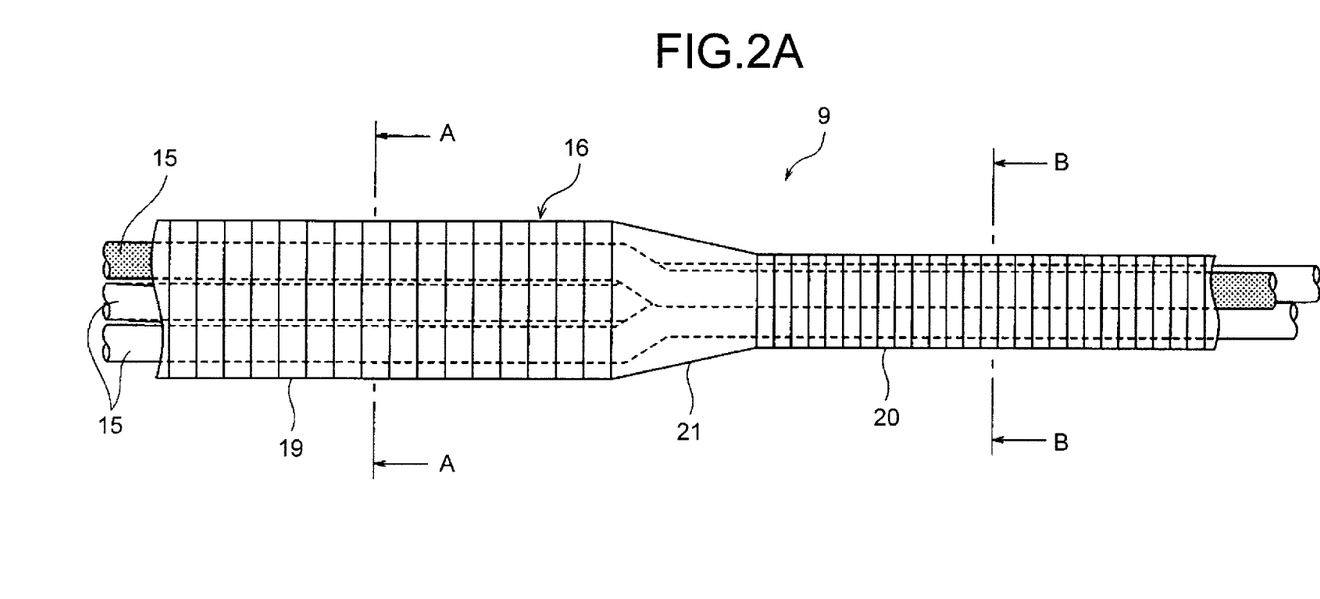
FIG. 2A is a view relating to the wire harness, more specifically, a view of the composition thereof.
Figure 2B:
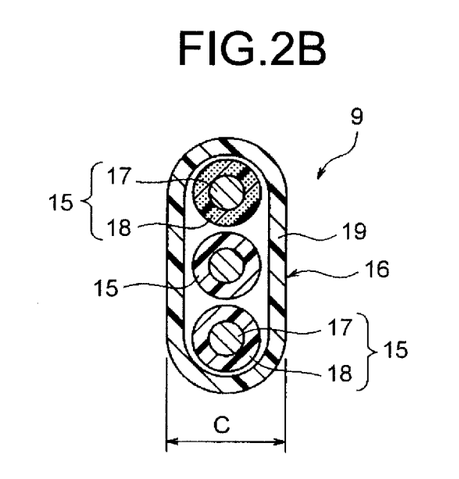
FIG. 2B is a view relating to the wire harness, more specifically, a cross-sectional view taken along the A-A line in FIG. 2A.
Figure 2C:
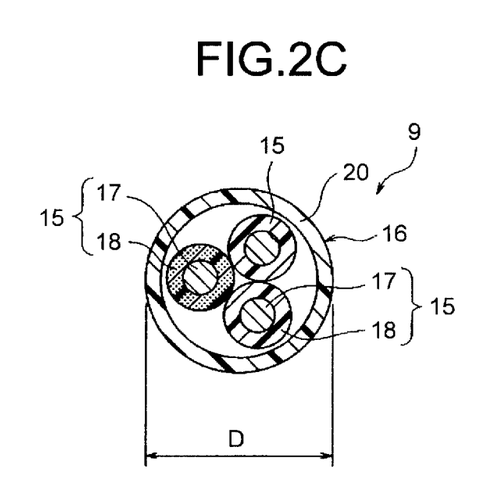
FIG. 2C is a view relating to the wire harness, more specifically, a cross-sectional view taken along the B-B line in FIG. 2A.
Figure 3A:
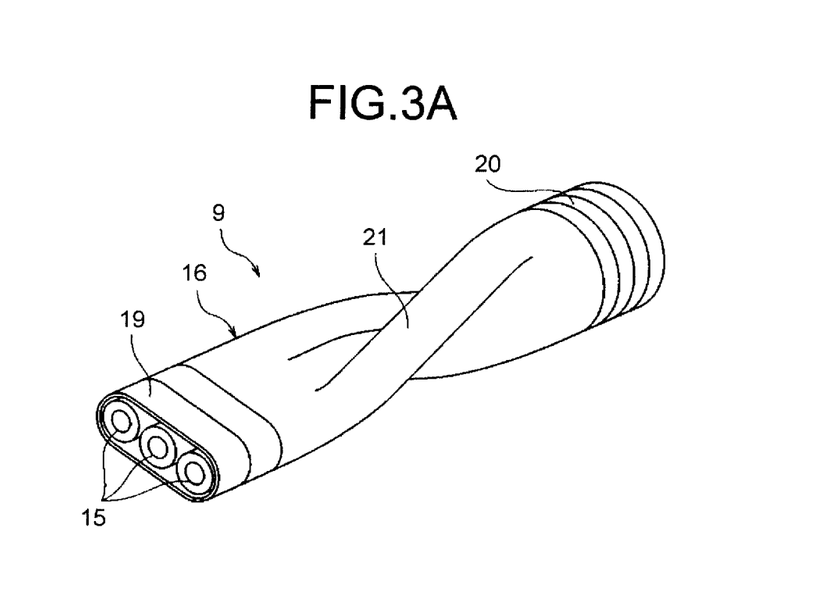
FIG. 3A is a view relating to a guiding shape portion, more specifically, a view illustrating the entirety thereof.
Figure 3B:
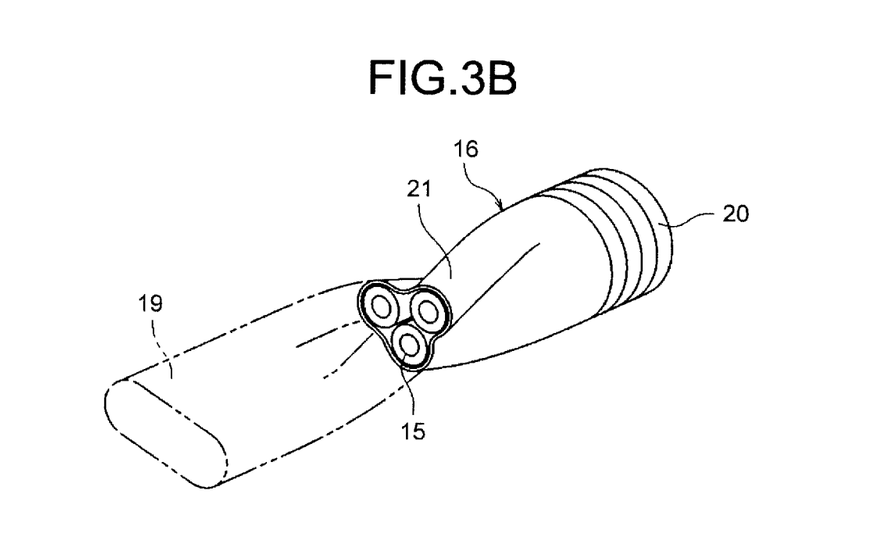
FIG. 3B is a view relating to the guiding shape portion, more specifically, a view illustrating a section in a central portion thereof.
Figure 3C:
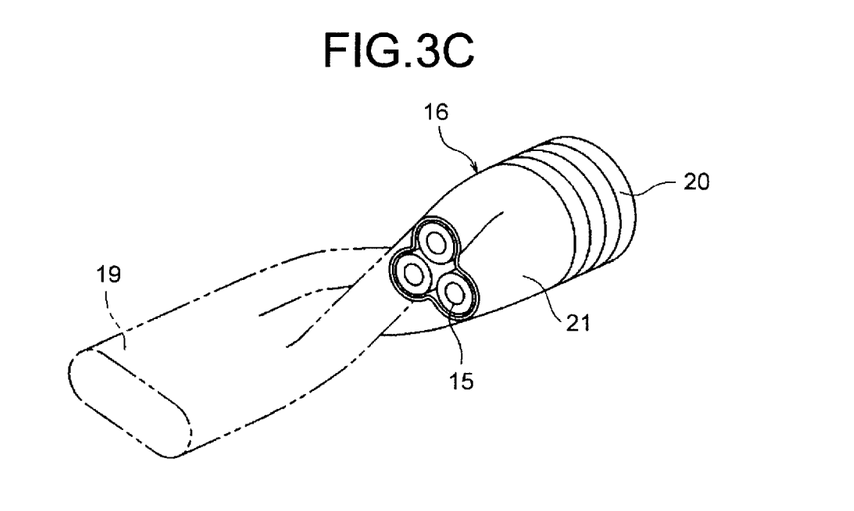
FIG. 3C is a view relating to the guiding shape portion, more specifically, a view illustrating a section in one side closer to a tube portion than the central portion is.
Figure 3D:
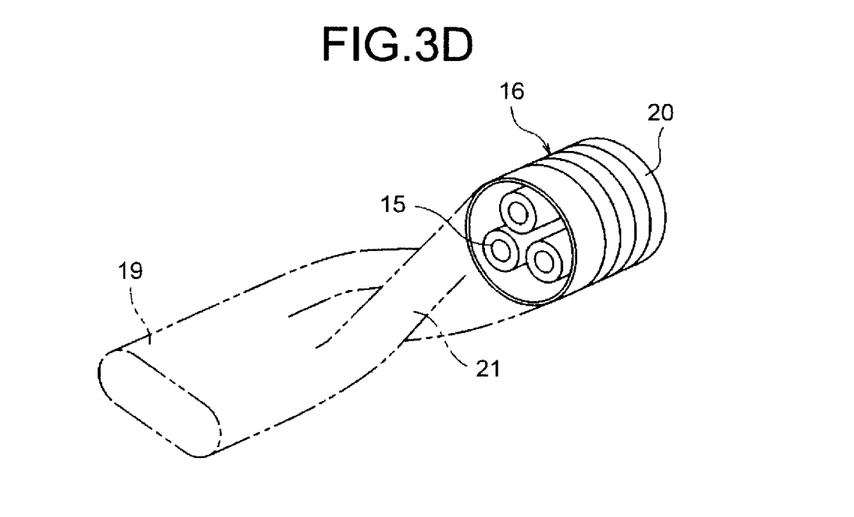
FIG. 3D is a view relating to the guiding shape portion, more specifically, a view illustrating a section thereof at the boundary portion between the guiding shape portion and the tube portion.
Figure 4:
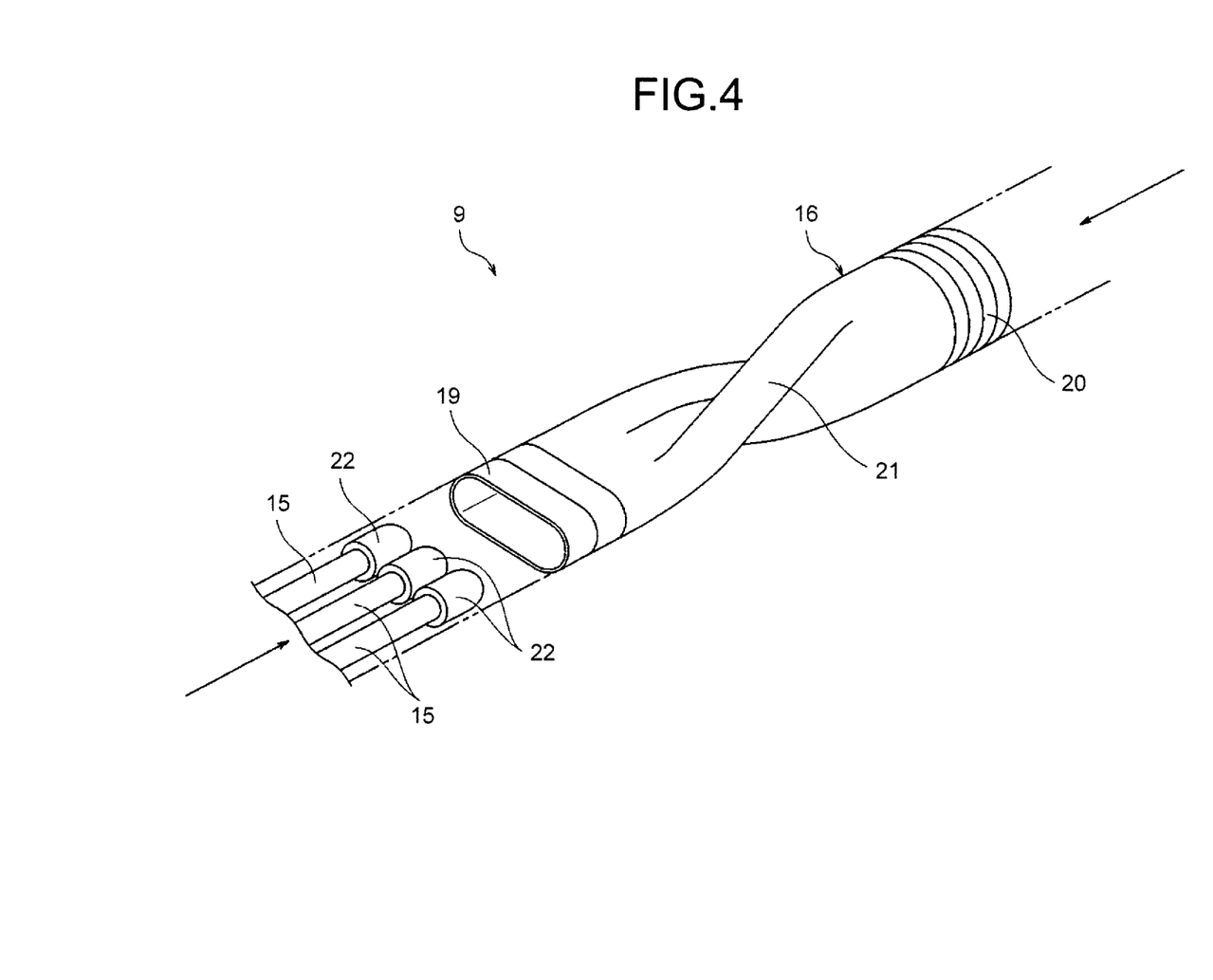
FIG. 4 is a view relating to a method for inserting electrical conductive paths according the present invention.

First Embodiment is described below with reference to the drawings. FIG. 1A is a view illustrating a routed wire harness, and FIG. 1B is an enlarged view of a main part of the wire harness. FIG. 2A is a view of the composition of the wire harness, FIG. 2B is a cross-sectional view taken along the A-A line in FIG. 2A, and FIG. 2C is a cross-sectional view taken along the B-B line in FIG. 2A. FIG. 3A is a view illustrating the entirety of a guiding shape portion, FIG. 3B is a view illustrating a section of a central portion of the guiding shape portion, FIG. 3C is a view illustrating a section in one side nearer to a tube portion than FIG. 3B, and FIG. 3D is a view illustrating a section at the boundary portion between the guiding shape portion and the tube portion. Furthermore, FIG. 4 is a view relating to a method of inserting electrical conductive paths according to the present invention.

In the present embodiment, the present invention is applied to a wire harness to be routed in a hybrid vehicle (which may be an electrical vehicle or a general vehicle).

In FIG. 1A, reference sign 1 indicates a hybrid vehicle. A hybrid vehicle 1 is a vehicle to be driven with mixed power from two sources, which are an engine 2 and a motor unit 3. To the motor unit 3, power is supplied from a battery 5 (a battery pack) via an inverter unit 4. The engine 2, the motor unit 3, and the inverter unit 4 are installed in an engine room 6 located in a position in which the front wheels are provided in the present embodiment. The battery 5 is installed in a vehicle rear part 7 in which the rear wheels are provided (but may be alternatively installed in a vehicle interior behind the engine room 6).

The motor unit 3 and the inverter unit 4 are interconnected via a high-voltage wire harness 8. The battery 5 and the inverter unit 4 are also interconnected via a high-voltage wire harness 9. An intermediate portion 10 of the wire harness 9 is routed in a vehicle floor underside 11. Here, the vehicle floor underside 11 is routed along and substantially in parallel to the vehicle floor underside 11. The vehicle floor underside 11 is a well-known body and what is called a panel member, and has a through-hole in a certain position. The wire harness 9 is inserted in a watertight manner through this through-hole.

The wire harness 9 and the battery 5 are connected via a junction block 12, which is provided to this battery 5. A rear end 13 of the wire harness 9 is electrically connected to the junction block 12 by a well-known method. A front end 14 side of the wire harness 9 is electrically connected to the inverter unit 4 by a well-known method.

The motor unit 3 includes a motor and a generator as components. Likewise, the inverter unit 4 includes an inverter and a converter as components. The motor unit 3 herein is constructed as a motor assembly that includes a shield case. Likewise, the inverter unit 4 herein is constructed as an inverter assembly that includes a shield case. The battery 5 is a Ni-MH based or Li-ion based battery, and has a modularized structure. Here, a storage apparatus such as a capacitor may be usable. The battery 5 is not particularly limited as long as it is usable in the hybrid vehicle 1 or an electrical vehicle.

In FIG. 1B, FIG. 2A, FIG. 2B, and FIG. 2C, the wire harness 9 according to the present invention is composed by including three electrical wires 15 (electrical conductive paths), an outer covering member 16 accommodating and protecting these electrical wires 15, device connecting members (for example, connectors or the like) (not illustrated) provided at terminals of the electrical wires 15, and a plurality of fixation members (for example, clamps or the like) and waterproof members (for example, grommets or the like) (not illustrated) attached to an outer surface of the outer covering member 16.

The number of electrical wires 15 is not limited to three as in the foregoing case but may be any number more than one. The electrical wires 15 may be a plurality of high-voltage electrical wires (for high-voltage power), a plurality of low-voltage electrical wires (for low-voltage power), or a plurality of high-voltage and low-voltage electrical wires. In the present embodiment, the electrical wires 15 are illustrated as those having the same diameter for the convenience of explanation.

In FIG. 2A, FIG. 2B, and FIG. 2C, as the electrical wires 15, three electrical wires are provided as in the foregoing case, and well-known electrical wires are used (however, the number thereof is not limited to three and may be two or more than three). Each of the electrical wires 15 is composed by including a conductor 17 and an insulator 18 covering this conductor 17. The electrical wire 15 is formed in a length necessary for electrical connection. The electrical wire 15 is formed in a long length because the wire harness 9 electrically interconnects the inverter unit 4 and the battery 5 (the junction block 12) (refer to FIG. 1A). The electrical wires 15 here include high-voltage and low-voltage electrical wires together.

For example, the conductor 17 for the electrical wire 15 for high-voltage power is made of copper or a copper alloy, or aluminum or an aluminum alloy. The conductor 17 may have either a conductor structure obtained by twisting together elemental strands or a rod-like conductor structure having a rectangular or circular cross-section (which is, for example, a rectangular single-core or circular single-core conductor structure, and in this case, the electrical wire is also rod-like). Any rigidity of the conductor 17 is allowable as long as the rigidity does not affect workability of insertion at a guiding shape portion 21 to be described later. The conductor 17 as described so far has the insulator 18 formed by extrusion molding on the outer surface thereof. The insulator 18 is made of an insulative resin material.

It is preferable that each of the electrical wires 15 is a shield electrical wire that includes a shield member in or outside of this composition, thereby having an electromagnetic shield measure taken therefor (this is not applicable when the outer covering member 16 is provided with a shield function). Here, a description of the electrical wire 15 for low-voltage power is omitted.

The outer covering member 16 is a tubular body made of resin covering the three electrical wires 15, and is formed in a length necessary for insertion and accommodation of the electrical wires 15 and in a thickness necessary for protection thereof. The outer covering member 16 in the present embodiment is formed in a long length. The outer covering member 16 is not limited to being made of resin as in the foregoing case, and may be made of metal or a combined member partially being resin and partially being metal.

The outer covering member 16 has tube portions 19 and 20 of a plurality of kinds and the guiding shape portion 21, which characterizes the present invention. The outer covering member 16 is formed in, for example, illustrated shapes. The tube portions 19 and 20 of the different kinds and the guiding shape portion 21 may be formed as one body or as separate bodies. The numbers or the like of tube portions 19 and 20 of the different kinds and guiding shape portions 21 is set as appropriate. The tube portions 19 and 20 of the different kinds and the guiding shape portion 21 are set and formed as appropriate so as to be suited to the shapes of places in which the wire harness 9 is routed and the usage environments.

When the tube portions 19 and 20 of the different kinds and the guiding shape portion 21 are formed as one body, workability related to production of the wire harness 9 is obviously more favorable because there is no parting section and because a process for fixing them to the electrical wires 15 is unnecessary.

The tube portions 19 and 20 are tubular portions that are different in either cross-sectional shape or size or in both. The tube portions 19 and 20 are formed so as to be disposed in a side-by-side array along the axial direction of the outer covering member 16. In the present embodiment, the tube portion 19 having an oval cross-section and the tube portion 20 having a circular cross-section are included. The tube portion 19 having an oval cross-section is formed as a portion routed along and substantially in parallel to the vehicle floor underside 11. The tube portion 20 having a circular cross-section is formed as a portion extending to the neighborhood of the battery 5. Another tube portion 20 having a circular cross-section is formed as a portion extending to the neighborhood of the inverter unit 4, separately from the foregoing tube portion 20. That is, in the present embodiment, the outer covering member 16 is formed so as to include two tube portions 20 each having a circular cross-section.

The tube portion 19 having an oval cross-section is described here a little further in detail. The tube portion 19 is formed so as to be able to accommodate the three electrical wires 15 that are arrayed laterally in a line. In the present embodiment, the cross-section thereof takes an oval shape but may take another shape such as an elliptical shape or a rectangular shape, for example. The tube portion 19 is formed in a bellows pipe shape and has flexibility, but is not particularly limited to this example (is not limited to being flexible but may be contrarily provided with rigidity, and is not limited to being formed in a bellows pipe shape).

The tube portions 20 each having a circular cross-section is described here a little further in detail. Each of the tube portion 20 is formed so as to be able to accommodate the three electrical wires 15 that are arrayed substantially in the same manner as a stack of rice bales. In the present embodiment, the cross-section thereof takes a circular shape but may take another shape such as a square shape, for example. The tube portion 20 is formed in a bellows pipe shape and has flexibility, but is not particularly limited to this example (is not limited to being flexible but may be contrarily provided with rigidity, and is not limited to being formed in a bellows pipe shape).

The dimension C of the tube portion 19 is smaller than the dimension D of the tube portion 20 because, while the tube portion 19 has an oval cross-section, the tube portion 20 has a circular cross-section. It is therefore advantageous to use the tube portion 19 having an oval cross-section as a portion that is routed on the vehicle floor underside 11 as described above (which brings an effect of making it possible to prevent the tube portion 19 from being damaged or broken by virtue of a sufficient distance thereof from the ground surface, for example, at the time of having a flying stone around or of riding on a curbstone; and an effect of enabling reduction in height of the tube portion).

The guiding shape portion 21 is formed so as to be disposed between adjacent tube portions out of the tube portions 19 and 20 as a guiding portion for guiding the electrical wires 15 when the electrical wires 15 are inserted. The guiding shape portion 21 is formed so that the shape thereof gradually changes from the tube portion 19 toward the tube portion 20 (from the tube portion 20 toward the tube portion 19). In other words, the guiding shape portion 21 is formed so that the shape thereof can change gradually. Furthermore, the guiding shape portion 21 is formed in a gradually changing shape so as not to have the electrical wires 15 caught by an irregularity when being inserted. The guiding shape portion 21 such as this one is formed so as to be able to change an array of the electrical wires 15.

Here, how the guiding shape portion 21 changes an array of the electrical wires 15 is described. In FIG. 2A, FIG. 2B, FIG. 2C, FIG. 3A, FIG. 3B, FIG. 3C, and FIG. 3D, the three electrical wires 15 arrayed laterally in a line are accommodated in the tube portion 19 having an oval cross-section. In contrast, the three electrical wires 15 arrayed substantially in the same manner as a stack of rice bales are accommodated in the tube portion 20 having a circular cross-section. The guiding shape portion 21 correspondingly changes the array of the three electrical wires 15.

As can be seen from the shape illustrated in FIG. 3A, FIG. 3B, FIG. 3C, and FIG. 3D, the guiding shape portion 21 in the present embodiment is formed in a shape that can guide each of the electrical wires 15 individually. Therefore, the present embodiment has an effect of enabling the electrical wires 15 to be smoothly inserted without being caught by an irregularity even when the adjacent tube portions 19 and 20 have different cross-sectional shapes.

Insertion of the electrical wires 15 may be permitted, as indicated by the arrows in FIG. 4, both from the tube portion 19 toward the tube portion 20 and from the tube portion 20 toward the tube portion 19. Additionally, when attachable and detachable caps 22 are attached to the front ends of the respective electrical wires 15 and are used to pass the electrical wires 15 through the guiding shape portion 21, the present embodiment further has an effect of more reliably enabling the electrical wires 15 to be smoothly inserted. Each of the caps 22 preferably is a cap the surface of which has low frictional resistance and which can be repetitively used. Each of the caps 22 in the present embodiment is formed in a smooth surface and in an ammunition shape and is repetitively usable in insertion work.

As described above with reference to FIG. 1 to FIG. 4, the wire harness 9 includes the outer covering member 16 including the tube portions 19 and 20 of a plurality of kinds in the axial direction thereof, thereby having an effect of enabling the wire harness 9 itself to be suited to the shapes of places (such as the vehicle floor underside 11) in which the wire harness 9 is routed and the usage environments.

The wire harness 9 not only includes the outer covering member 16 composed of the tube portions 19 and 20 of a plurality of kinds but also includes the guiding shape portion 21, thereby having an effect of enabling the three electrical wires 15 to be smoothly inserted without jamming of an electrical wire when being inserted through the outer covering member 16.

In more detail, the wire harness 9 has the guiding shape portion 21 formed so that the shape thereof can gradually change, thereby having an effect of enabling the electrical wires 15 (electrical conductive paths) to be less likely caught by an irregularity. Consequently, the wire harness 9 has an effect of enabling the electrical wires 15 to be smoothly inserted without jamming halfway.

Consequently, the wire harness 9 has the guiding shape portion 21 formed so as to be able to change an array of the electrical wires 15 (electrical conductive paths), thereby having an effect of enabling the electrical wires 15 to be smoothly inserted without jamming halfway even when the tube portions 19 and 20 having cross-sectional shapes different from each other are used in combination.

Furthermore, the wire harness 9 has the guiding shape portion 21 formed so as to be unaffected by the insertion direction, thereby having an effect of enabling production thereof to be performed with favorable workability.

The present embodiment thus has an effect on the wire harness 9 itself that the wire harness 9 can be favorably routed in places including the vehicle floor underside 11, and also has an effect on the production of the wire harness 9 that the production can be performed with favorable workability.

Second Embodiment

Figure 5:
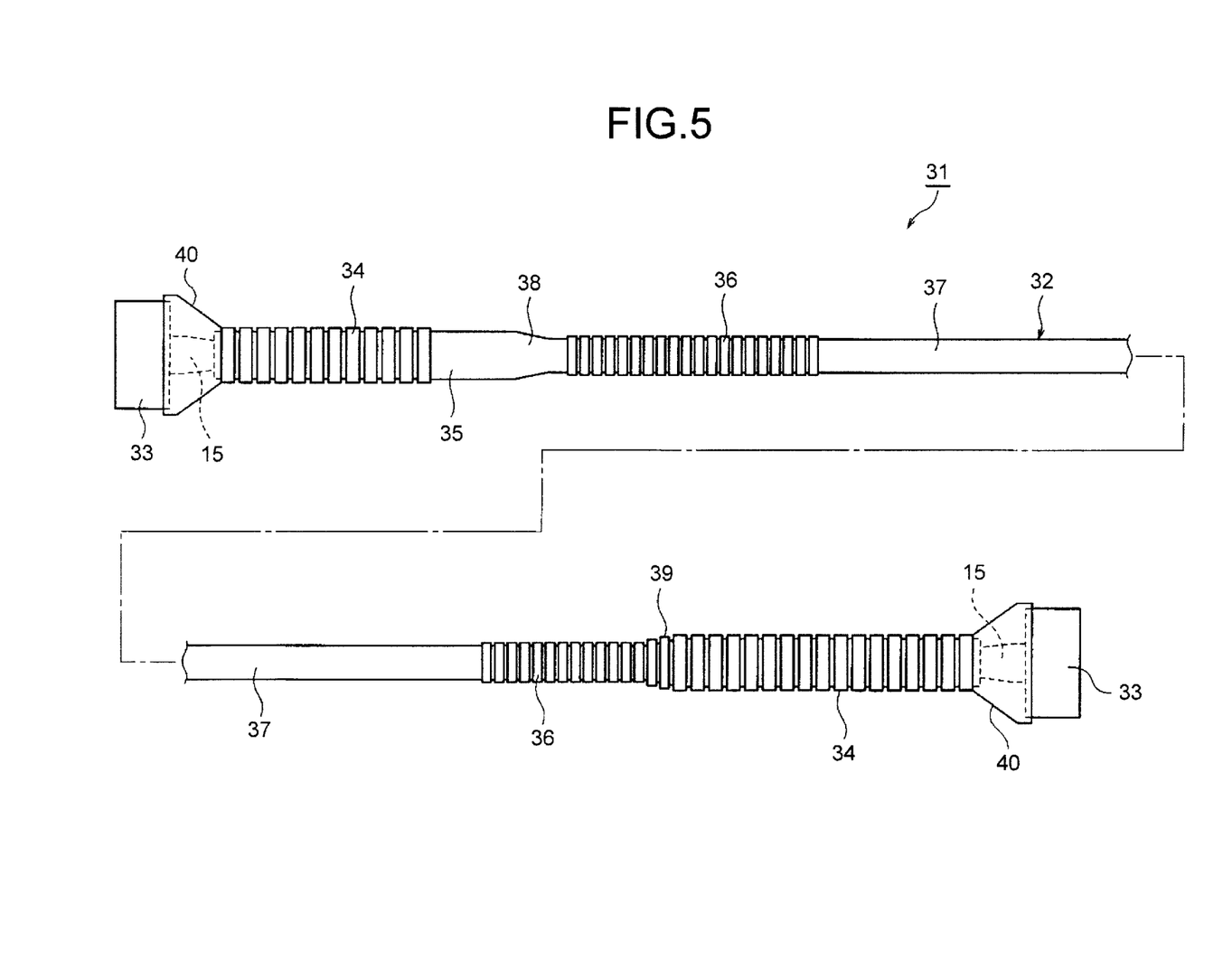
FIG. 5 is a view illustrating a wire harness provided as another example (Second Embodiment).

Second Embodiment is described below with reference to the drawings. FIG. 5 is a view illustrating a wire harness as another example.

In FIG. 5, a wire harness 31 is composed by including at least three electrical wires 15 (electrical conductive paths), an outer covering member 32 accommodating and protecting these electrical wires 15, shield connectors 33 (device connecting members) attached to the terminals of the electrical wires 15, and a plurality of fixation members (such as clamps, for example) and waterproof members (such as grommets, for example) (which are not illustrated) attached to an outer surface of the outer covering member 32. The electrical wires 15 used in the present embodiment are the same as those used in the First Embodiment.

The outer covering member 32 is a tubular body made of resin covering at least three electrical wires 15, and is formed in a length necessary for insertion and accommodation of the electrical wires 15 and in a thickness necessary for protection thereof. The outer covering member 32 in the present embodiment is formed so as to be basically the same as the outer covering member in the First Embodiment.

The outer covering member 32 has tube portions 34 to 37 of a plurality of kinds and guiding shape portions 38 and 39, and is formed in, for example, illustrated shapes. The tube portions 34 to 37 of a plurality of kinds and the guiding shape portions 38 and 39 are formed so as to be disposed in a side-by-side array along the axial direction of the outer covering member 32. In the present embodiment, the outer covering member 32 is formed as one body. The tube portions 34 to 37 of the different kinds and the guiding shape portions 38 and 39 are set and formed as appropriate so as to be suited to the shapes of places in which the wire harness 31 is routed and the usage environments.

The tube portion 34 has a bellows pipe shape having flexibility and is formed in a circular cross-section. The tube portions 34 are formed on both one and the other end sides of the outer covering member 32. The tube portion 35 is formed in a circular cross-section while being formed in a straight pipe shape that does not have such flexibility as the tube portion 34 has. The tube portion 35 is formed so as to be disposed continuously to the tube portion 34 on the one end side. The tube portions 34 and 35 are formed in the same size.

Regarding the tube portions 36 and 37, the tube portion 37 is described firstly. The tube portion 37 is formed as a portion that is routed on the vehicle floor underside 11 (refer to FIG. 1A) and that has a straight pipe shape. The tube portion 37 is straightly formed because it has a straight pipe shape. In the present embodiment, the tube portion 37 as described above is formed in an oval cross-section. Next, the tube portions 36 are formed and disposed continuously to both one end and the other end of the tube portion 37, respectively. Each of the tube portions 36 has a bellows pipe shape having flexibility and is formed in an oval cross-section. The tube portions 36 and 37 are formed in the same size.

The guiding shape portion 38 is formed and disposed between the tube portion 35 and the tube portion 36, which are different from each other in cross-sectional shape and size. The guiding shape portion 38 is formed so that the shape thereof gradually changes from the tube portion 35 toward the tube portion 36. In other words, the guiding shape portion 38 is formed so that the shape thereof gradually change (is formed in a gradually changing shape).

The guiding shape portion 39 is formed as a portion that functions in the same manner as the guiding shape portion 38 functions. The guiding shape portion 39 is formed so as to be disposed between the tube portion 34 and the tube portion 36, which are different in cross-sectional shape and size. The guiding shape portion 39 is formed so that the shape thereof gradually changes from the tube portion 34 toward the tube portion 36 (from the tube portion 36 toward the tube portion 34). In other words, the guiding shape portion 39 is formed so that the shape thereof can gradually change (is formed in a gently changing shape). The guiding shape portion 39 herein is formed in a bellows pipe shape in the same manner as the tube portions 34 and 36 (a bellows pipe shape is merely one example).

As each of the shield connectors 33, a well-known device is used. A detailed description thereof is therefore omitted here. Reference sign 40 indicates a boot. A description of the boots 40 is also omitted here.

With the foregoing compositions and structures, the wire harness 31 is produced in the following manner. That is, the wire harness 31 is produced by having the electrical wires 15 inserted from one end to the other end of the outer covering member 32 including tube portions 34 to 37 of a plurality of kinds and the guiding shape portions 38 and 39. While being inserted, the electrical wires 15 can be smoothly inserted by virtue of the foregoing composition of the outer covering member 32. After the electrical wires 15 are inserted, the wire harness 31 undergoes processes of attaching such members as grommets to certain positions on the outer surface of the outer covering member 32 and attaching the shield connectors 33 and the boots 40 to the respective terminal portions of the electrical wires 15, whereby the production is completed.

The wire harness 31 has the same effects as the wire harness 9 in the First Embodiment.

Needless to say, various changes can be made to the present invention without departing from the scope and the spirit of the present invention.

In a wire harness according to the present invention, an outer covering member is composed so as to include, along the axial direction thereof, tube portions of a plurality of kinds. The wire harness thus has an effect of enabling combination of the tube portions such that the wire harness itself is suited to the shapes of places in which the wire harness is routed and the usage environments. According to the present invention, an outer covering member is composed of tube portions of a plurality of kinds, and a guiding shape portion is further included as a component of the outer covering member. The present invention thus has an effect of, when a plurality of electrical conductive paths are inserted through the outer covering member, for example, enabling the electrical conductive paths to be smoothly inserted without jamming halfway. The present invention thus has an effect on the wire harness itself that a wire harness can be favorably routed in places including a vehicle floor underside, and has an effect on the production of a wire harness that the production can be performed with favorable workability.

In a method for inserting electrical conductive paths through a wire harness according to the present invention, the foregoing outer covering member and electrical conductive paths are used, a cap is provided to each one end of the electrical conductive paths, and the electrical conductive paths are passed through the guiding shape portion with one side thereof that has the caps facing frontward. The method thus has an effect of enabling the electrical conductive paths to be smoothly inserted without jamming halfway.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a plurality of electrical conductive paths; and an outer covering member configured to have the electrical conductive paths inserted therethrough and protect the electrical conductive paths, wherein the outer covering member includes, along an axial direction thereof, a pair of tube portions different from each other in cross-sectional shape and/or size and a guiding shape portion provided between the tube portions, the guiding shape portion serving as a portion that guides front ends of the electrical conductive paths from one of the tube portions to the other of the tube portions at a time the electrical conductive paths are inserted, and the guiding shape portion is formed so that a shape thereof gradually changes from one to the other of the tube portions and configured to guide each of the front ends of the electrical conductive paths individually, the guiding shape portion comprising a plurality of separate tube elements, each tube element receiving at least one of the conductive paths, the guiding shape portion including at least three of the tube elements, each of the tube elements being formed in a spiral shape.

2. The wire harness according to claim 1, wherein the guiding shape portion is formed so as to change an array of the electrical conductive paths from the one to the other of the tube portions.

3. The wire harness according to claim 1, wherein the guiding shape portion is formed so as to be able to guide the front ends of the electrical conductive paths regardless of whether a guiding is from the one to the other or from the other to the one of the tube portions.

4. The wire harness according to claim 2, wherein the guiding shape portion is formed so as to be able to guide the front ends of the electrical conductive paths regardless of whether a guiding is from the one to the other or from the other to the one of the tube portions.

5. A method for inserting electrical conductive paths through a wire harness, the method comprising: providing a cap to each one end of a plurality of electrical conductive paths of a wire harness, the wire harness including an outer covering member configured to have the electrical conductive paths inserted therethrough and protect the electrical conductive paths, the outer covering member including, along an axial direction thereof, a pair of tube portions different from each other in cross-sectional shape and/or size and a guiding shape portion provided between the tube portions, the guiding shape portion serving as a portion that guides front ends of the electrical conductive paths from one of the tube portions to the other of the tube portions at a time the electrical conductive paths are inserted, and the guiding shape portion is formed so that a shape thereof gradually changes from one to the other of the tube portions and configured to guide each of the front ends of the electrical conductive paths individually, the guiding shape portion comprising a plurality of separate tube elements, each tube element receiving at least one of the conductive paths, the guiding shape portion including at least three of the tube elements, each of the tube elements being formed in a spiral shape; and passing the electrical conductive paths through the guiding shape portion, and an associated tube element, with one side that has the caps facing frontward at the time the electrical conductive paths are inserted through the outer covering member.

6. The wire harness according to claim 1, wherein
one of the tube portions accommodates the plurality of electrical conductive paths arrayed laterally in a line, and
the other of the tube portions accommodates the plurality of electrical conductive paths stacked in a triangular shape.

\* \* \* \* \*